M. S. DE CARMONA.
SPRING WHEEL.
APPLICATION FILED OCT. 15, 1917.

1,287,255.

Patented Dec. 10, 1918.

WITNESSES:

INVENTOR
M. S. de Carmona

BY

ATTORNEYS

UNITED STATES PATENT OFFICE.

MANUEL S. DE CARMONA, OF MEXICO, MEXICO.

SPRING-WHEEL.

1,287,255.
Specification of Letters Patent.
Patented Dec. 10, 1918.

Application filed October 15, 1917. Serial No. 196,693.

*To all whom it may concern:*

Be it known that I, MANUEL SANCHEZ DE CARMONA, a citizen of Mexico, and a resident of the city of Mexico, in the Republic of Mexico, have invented a new and Improved Spring-Wheel, of which the following is a full, clear, and exact description.

My invention relates to spring wheels for vehicles and has reference more particularly to spring wheels for motor vehicles.

An object of the invention is to provide a simple and efficient wheel the resilient elements of which are disposed to act at right angles to the plane of the wheel.

A further object of the invention is to provide a spring wheel which is normally stressed and the deformation of the stressed parts of wheel during the movement of same under load increases the resiliency of the wheel.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1:
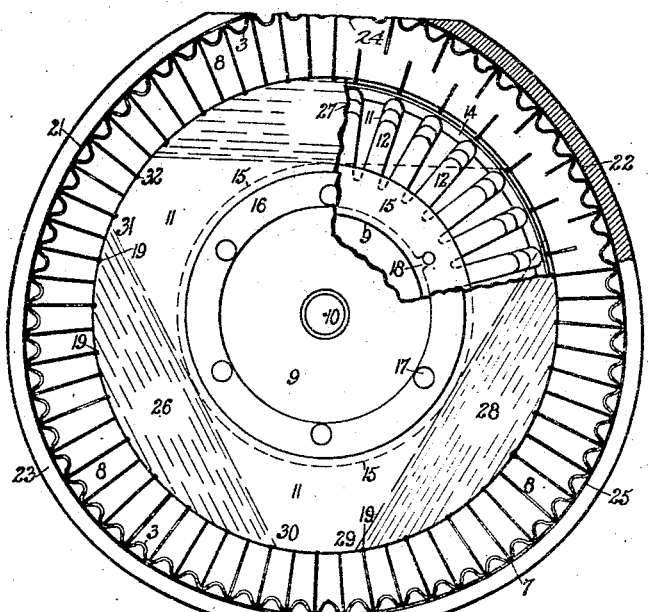
Figure 1 is an elevation of a wheel embodying my invention, certain parts of the wheel being broken away to show the details of construction, the wheel being shown off the ground, that is, not supporting a load.

Referring to the drawings, 1 is the rim, which is preferably of spring metal so that the same will yield under predetermined pressures. A shoe or tread 2 encompasses the rim. Said shoe may be of rubber or textile material. The resiliency of the rim may be increased when the wheels are to be used for vehicles designed to carry greater loads by providing corrugated rings 3 of resilient material. The number of such rings may be varied in accordance with the capacity for which the wheel is designed.

Figure 3:
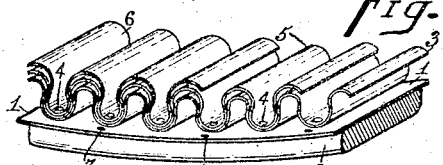
Fig. 3 is a fragmentary perspective view of the rim of the wheel and the tread associated therewith.

As shown in Fig. 3, there are three rings, indicated by 3, 5 and 6. The corrugated rings are secured to the rim 1, at the points where the corrugations of the ring are in contact with the rim, by rivets 4. The rim 1 is wider than the corrugated rings to present a margin on each side of said rings. In said margin openings 7 are provided at equal intervals.

Figure 2:
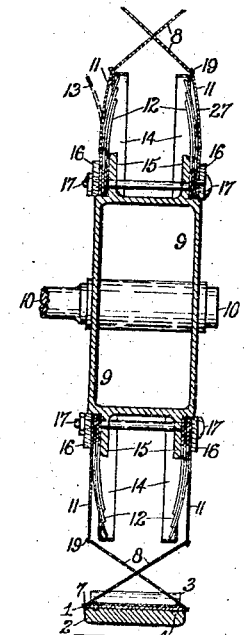
Fig. 2 is a transverse cross section through the wheel in Fig. 1.

The hub 10 carries a drum 9 which is constrained to revolve therewith and which is provided with flanges 15 offset from each face of the drum. Each of the flanges 15 forms a seat for a resilient crown 12. The crown is preferably formed of a series of disks each having resilient fingers, the outer disks having, preferably, longer fingers than the inner disks, and the fingers of the disks of the same crown superimposing, so that each series of fingers really forms a leaf spring the normal tendency of which is to flex outwardly, as indicated in dotted lines in Fig. 2 and marked 13. Each of the crowns is surmounted by a disk 11 of resilient material, and with the crowns the same are secured to the flanges 15 by bolts 17. Preferably washers 16 are provided on the disks for the bolts.

The margin of each crown, that is, the extremities of the fingers, is engaged by a ring 14 which is of angular cross section. This ring, therefore, is interposed at the margin of the crown between the crown and the adjacent disk 11.

Each of the disks 11 is secured to the rim by flexible inelastic members 8 of equal length, for which the disk is provided with openings 19 at the margin, the flexible members engaging the openings 7 in the rim and the openings 19 in the disk. Said flexible members 8 connect the outer disk with the inner edge of the rim and the inner disk to the outer edge of the rim; in other words, the adjacent flexible members cross. The length of the flexible members 8 is not sufficent to make the rim 1 concentric with the axis of the wheel, or circular. In other words, the members 8 are shorter than would be required to allow the rim 1 to become circular. In consequence, if the rim 1 is placed in a position concentric to the axis of the wheel it will be found that none of the members 8 reach the point at which its other end is to be secured; and in order to obtain this the rim 1 is bent or stressed inwardly at any three points, such as 20, 21 and 22 located 120° from each other (see Fig. 1). The three inward bends of the rim 1 will correspond, necessarily, with three outward bends 23, 24 and 25, likewise 120° apart. These bulged-out portions of the rim are at a greater distance from the disks 11, and, therefore, the latter will have to be flexed at 26, 27, 28, to allow the flexible members 8 to be anchored to the bulged-out portion of the rim 1. The result is that between the points 30—31, 32—33 and 34—29, the disks 11 are depressed inwardly, in consequence, forcing the yielding fingers of the crown inwardly through the medium of the rings 14 which contact with the disks. Since the flexible members 8 cannot stretch and the disks 11 cannot form a cup the wheel is deformed, deformation being exaggerated in the figures. The rigid rings 14 under the elastic pressure of the tongues 12 bearing against them exert a strong outward pressure on the deformed segments 26, 27 and 28. As a result of this, the said segments always tend to become flattened out and, consequently, pull strongly on the flexible members 8 and, therefore, on the bulged-out parts 23, 24 and 25 of the rim 1. But those points are unable to yield, since to do so it would be necessary for the inwardly-bent portions 20, 21 and 22 to yield outwardly, which is impossible, as they are prevented by the flexible members 8 connecting the said parts to the disks 11 at 29—30, 31—32, and 33—34. Since the deflected surfaces 26, 27 and 28 of the disk 11 are limited by the flange 15, the portions 29—30, 31—32, and 33—34 are practically undeformable, and the points 29, 30, 31, 32, 33, and 34 are points of absolute resistance, for the disks cannot shape into a cup, as previously mentioned.

From the explanation given above it follows that the three points 20, 21 and 22, at which the distance from the rim 1 to the center of the wheel is smallest, there exists a strong initial outward pressure. This initial deformation of the wheel, as above described, maintains the same stressed normally, and when the wheel is subjected to a load (see Fig. 4) the parts subjected to the load will move inwardly, slightly increasing the deformation of the wheel. Due to the inward movement of the parts subjected to the load (see Fig. 4), the parts 23 and 25 will be caused to bulge, due to the increase of stress on the flexible members at those points which causes an increase in the deflection of the segments 26 and 28. The rim 1 being a unit, these outward deformations are transmitted to the point 24, which transmits it to the segment 27, the deflection of which will increase in a manner similar to the segments 26 and 28. The reaction of the load is also on a radial line passing through the point 24 of the wheel. Thus, it will be seen that the resultant stresses caused in the parts 23, 24 and 25 of the wheel will react with the forces at the point 20. This will be true no matter what portion of the wheel forms the point 20, there will be corresponding portions of the wheel forming points 23, 24 and 25. The flexible members 8 at 20 will be loosened, but the parts 29—30, 31—32 and 33—34 of the disks cannot bend due to the presence of the segmental parts of the disks 26, 27 and 28.

To prevent the sagging of the members 8 at the point where the rim is subjected to the load, I may provide springs 37 which are connected to the flexible members 8 so as to tighten or raise the same when they become loose due to the deflection of the rim under the load.

Figure 4:
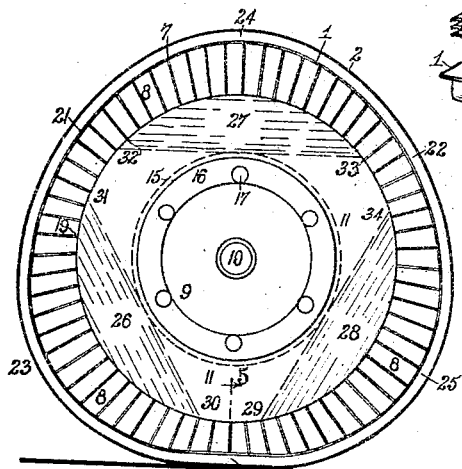
Fig. 4 is an elevation of the wheel when supporting the weight of the vehicle.
Figure 5:
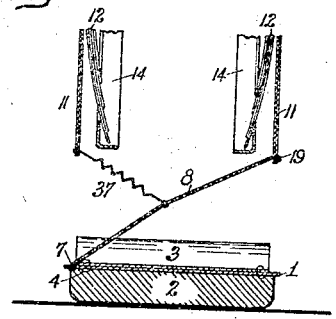
Fig. 5 is a fragmentary cross section on line 5—5, Fig. 4.

As the wheel rotates the rim is successively forced inwardly, thereby relieving strain on the proximate margin of the disks 11 and, in consequence, causing the segmental deformations 26, 27 and 28 to move on the margins of the disks as the successive parts of the rim are subjected to the load. In other words, during the rotation of the wheel the deformations 26, 27 and 28 travel along the margins of the disks but the crowns remain constantly under the stress of said deformations, in other words, said crowns are subject to constant strain, although the surface deformations of the disks are displaced continuously along the margins of the disks as the wheel travels. It may be remarked that the segments 26, 27 and 28 have their position constant with reference to the vertical, that is, to any position of the wheel in elevation. In other words, no matter what position the disks occupy, the deformations 26, 27 and 28 will be always in elevation in the position as shown in Fig. 4.

One of the principal characteristics of my wheel is that it is initially stressed. The additional deformation caused by the load only intensifies the initial deformation given to the wheel. As shown in the drawings, the wheel appears in elevation in the shape of a triangle having rounded sides and apexes; which in no way interferes with the even riding of the wheel.

I claim:

1. In a spring wheel, a yielding rim, a hub, resilient means on said hub mounted to act laterally of the wheel, and flexible members connecting the resilient means to the rim to initially stress and subject the adjacent parts of the rim to oppositely-directed radial forces.

2. In a spring wheel, a yielding rim, a hub, resilient means on each face of the wheel mounted to act transversely of the plane of the wheel, and flexible members securing said resilient means to the rim so that adjacent parts of said rim are subject to oppositely-directed radial forces even when the wheel is not subject to a load, the portions of said resilient means opposite the parts of the rim which are subject to the outwardly-directed radial forces being depressed from the faces of the wheel, the depressed portions moving along said resilient means and conserving always their relative position as the load changes its effect along the rim.

3. In a spring wheel, a yielding rim, a hub, a crown on each face of the wheel secured to the hub and presenting a resilient margin, a disk on each face of the wheel engaging the margin of the adjacent crown, flexible members connecting the margin of the disks to the rim so that adjacent sections of the rim are subject to oppositely-directed radial forces even when the wheel is not subject to a load, the portion of the disks in proximity to the sections of the rim subject to outwardly-directed radial forces being depressed from the face of the wheel whereby the resilient margin of the crown is initially stressed, the depressed portions moving along said resilient means and conserving always their relative position as the load changes its effect along the rim.

4. A spring wheel having a yielding circular rim, and resilient means for initially deforming the circular shape of the rim at predetermined points.

5. A spring wheel having a circular rim adapted to yield radially, and resilient means on each side of the rim adapted to yield laterally of the rim for deforming initially the circular shape of the rim at predetermined points.

6. In a spring wheel, a radially yielding rim, resilient means yielding laterally of the wheel, and means connecting the rim to the resilient means to deform the circular shape of the rim even before the wheel is subjected to a load.

7. In a spring wheel, a radially yielding rim, resilient means yielding laterally of the wheel and disposed on each side of the rim, and flexible means connecting the rim to the resilient means to deform the circular shape of the rim at predetermined places even before the wheel is subjected to a load and to deflect laterally predetermined parts of said resilient means.

8. In a spring wheel, a radially yielding rim, a hub, a crown on each face of the wheel secured to the hub and presenting resilient fingers at the margin of the crown, a resilient disk on each face of the wheel bearing on the adjacent resilient fingers of the adjacent crown, and flexible members connecting the margins of the disks to the rim so that the circular shape of the rim is deformed, said disks having segmental portions inwardly deflected even before the wheel is subjected to a load.

9. In a spring wheel, a radially yielding rim, a hub, a crown on each face of the wheel secured to the hub and presenting leaf springs at the margin of the crown normally tending to flex outwardly, a disk on each face of the wheel, a rigid ring interposed between the margin of the disk and the adjacent leaf springs of the crown, and flexible members connecting the margins of the disks to the rim so that normally the circular shape of the rim is deformed and segmental parts of said disks are depressed inwardly, said rings interposed between the disks and the leaf springs subjecting all of said leaf springs to the same stress caused by the segmental deformation of the disks.

10. In a spring wheel, a radially yielding rim, a hub, a crown on each face of the wheel secured to the hub and presenting leaf springs at the margins normally acting laterally and outwardly of the wheel, a rigid ring engaging the extremities of the leaf springs of each crown, a disk on each face of the wheel, and flexible members connecting the margins of the disks to the rim so that segmental portions of said disks are depressed inwardly against the rigid rings whereby all of the leaf springs of the same crown are depressed inwardly, the deformation of said disks normally deforming the circular shape of the rim.

11. In a spring wheel, a radially yielding rim, resilient means yielding laterally of the wheel, and means connecting the rim to the resilient means so as to initially deform the circular shape of the rim at points at angles 120° apart.

12. In a spring wheel, a radially yielding rim, resilient disks yielding laterally at the wheel, and means connecting the rim to the resilient disks so as to initially deform the circular shape of the rim by forcing outwardly parts of the rim at angles 120° apart and to depress laterally segments of the disks at substantially the same points.

MANUEL S. de CARMONA.

Copies of this patent may be obtained for five cents each, by addressing the "Commissioner of Patents. Washington, D. C."